July 10, 1956     J. BOUVAT-MARTIN     2,754,161
DEVICES FOR LUBRICATING AND SEALING THE WHEEL
SIDE OF AXLE BOXES IN RAILWAY VEHICLES
Filed Aug. 5, 1953
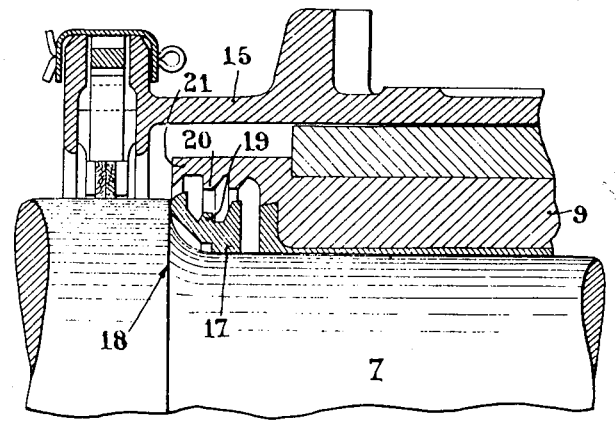

United States Patent Office 2,754,161
Patented July 10, 1956

2,754,161

DEVICES FOR LUBRICATING AND SEALING THE WHEEL SIDE OF AXLE BOXES IN RAILWAY VEHICLES

Jean Bouvat-Martin, Paris, France, assignor to Societe Anonyme dite: Societe Generale Isothermos, Paris, France Original application April 22, 1952, Serial No. 283,661. Divided and this application August 5, 1953, Serial No. 372,426

Claims priority, application France April 9, 1952

1 Claim. (Cl. 308—36.4)

This application is a division of my application Serial No. 283,661, filed April 22, 1952, now abandoned.

It is known to seal an axle box and notably to prevent the lubricating oil from leaking through the clearance developing inevitably between the axle and bearing, by providing on the axle and on the inner side of the casing, grooves cooperating with the grooves formed on the registering wall of the box, so that they will constantly return the splashed oil to the inside of the box.

Now the essential scope of this invention is to provide a device whereby the axle box can be sealed against oil leaks without resorting to arrangements of the former type indicated hereabove and wherein, due to the play developed by wear, the higher the velocity of operation or the heat developed thereby, the greater the amount of oil leaking from the box.

It has been found that in spite of the high speeds attained by modern railway vehicles, the oil-tightness of the mating surfaces of the bearing and spindle assembly are much greater than required, if the oil film builds up regularly therebetween.

Now this invention consists in mounting on the axle, on the wheel side, between the bearing and the fixing shoulder, an insert ring made of one or more elements and having a grooved or splined cross-sectional profile designed to counteract the leaking of oil to the outside.

The bearing is reduced in length to permit the fitting of this ring and is formed with a circular skirt-like extension the inner face of which surrounds the ring and has an indented profile corresponding to the grooves or splines formed on the insert ring for promoting the dripping of the oil projected towards the inner portion of the box.

This arrangement is shown in sectional view in the attached drawing.

Intermediate the edge of the bearing 9 and the fixing shoulder 18 of the spindle 7 there is secured an insert ring 17 consisting of one or more elements and having an indented profile 19 associated with buttress-shaped splines 20 provided on the inner face of a skirt-like lateral extension 21 of the bearing which surrounds the ring 17.

It will be readily understood that any oil escaping between the bearing 9 and shaft 7 cannot be projected to the outside owing to the cooperating indentations 19, 20 which will return this oil to the inside of the box.

Due to the provision of registering ribs 19 of ring 17 and grooves 20 of the skirt-like extension 21 of the bearing, it is no more necessary to have the upper wall 15 of the axle box connected through a sloped or tapered portion with the portion constituting the shaft bearing proper, as in the case of axle boxes of the conventional, former type in which no ring is provided for preventing the oil film formed between the shaft and the bearing from leaking to the outside.

What I claim is:

In a system for railway rolling stock comprising an axle of which a cylindrical journal is limited by a fixing shoulder, a bearing having a cylindrical working surface engaging said cylindrical journal, said bearing extending up to said fixing shoulder, and an axle box resting upon said bearing, an axle-box sealing device for the pressure-lubrication of the cylindrical journal of said axle and of the cylindrical working surface of said bearing, in which device said cylindrical working surface of said bearing extends short of said fixing shoulder, said bearing extending beyond said working surface towards said fixing shoulder with an end portion surrounding said cylindrical journal up to said fixing shoulder, said end portion having an inner surface defining an annular space around said cylindrical journal up to said fixing shoulder, said device comprising an oil-arresting ring rigidly mounted around said cylindrical journal in the annular space bounded by said inner surface of said end portion of the bearing, said ring having circular ribs formed on its outer periphery, and other circular ribs registering with said circular ribs of said ring and being formed on the inner surface of said bearing end portion.

References Cited in the file of this patent

UNITED STATES PATENTS

| | | |
|---|---|---|
| 872,365 | Ver Planck | Dec. 3, 1907 |
| 1,224,260 | Bergstrom | May 1, 1917 |
| 1,724,902 | Bentley | Aug. 20, 1929 |
| 1,865,951 | Peyinghaus | July 5, 1932 |
| 1,922,076 | Brittain | Aug. 15, 1933 |